United States Patent [19]

Inagaki et al.

[11] Patent Number: 4,531,432

[45] Date of Patent: Jul. 30, 1985

[54] AUTOMATIC TRANSMISSION CONTROL DEVICE FOR AUTOMOBILE

[75] Inventors: Takafumi Inagaki; Masahiro Ueda, both of Toyota, Japan

[73] Assignee: Toyota Jidosha Kabushiki Kaisha, Toyota, Japan

[21] Appl. No.: 501,782

[22] Filed: Jun. 7, 1983

[30] Foreign Application Priority Data

Aug. 21, 1982 [JP] Japan .................... 57-144925

[51] Int. Cl.$^3$ ............................................. B60K 21/00
[52] U.S. Cl. ......................................... 74/866; 74/844
[58] Field of Search .................. 74/844, 862, 865, 866

[56] References Cited

U.S. PATENT DOCUMENTS

| | | | |
|---|---|---|---|
| 3,640,156 | 2/1972 | Mori et al. | 74/844 X |
| 3,732,754 | 5/1973 | Mori | 74/866 |
| 3,813,964 | 6/1974 | Ichimura et al. | 74/866 |
| 3,895,541 | 7/1975 | Nohira et al. | 74/844 |
| 4,282,780 | 8/1981 | Totani et al. | 74/866 |
| 4,421,192 | 12/1983 | Ito et al. | 74/866 X |

Primary Examiner—Allan D. Herrmann
Assistant Examiner—Joseph M. Rolnicki
Attorney, Agent, or Firm—Cushman, Darby & Cushman

[57] ABSTRACT

An automatic transmission control device for an automobile including a fixed speed driving apparatus outputting a deviation enlargement signal when the deviation is enlarged from a set fixed speed of the automobile, a cooling water temperature detector outputting a cooling water temperature detection signal in accordance with the temperature of the cooling water, and a shift control circuit inputting said deviation enlargement signal and said cooling water temperature detection signal and controlling the transmission in accordance with deviation enlargement and temperature of the cooling water, wherein either one signal of said deviation enlargement signal or said cooling water temperature detection signal is input as a continuous signal and the other signal is input as a discontinuous signal so that said shift control circuit inputs both of said signals through a common input terminal.

7 Claims, 3 Drawing Figures

| INPUT CONDITION | | CONTROLLING CONTENTS |
|---|---|---|
| COOLING WATER TEMPERATURE DETECTOR 16 | FIXED SPEED DRIVING APPARATUS 10 | |
| ⊓⊓⊓ | H ⎴ | OVERDRIVE THIRD LOCKUP |
| H ⎴ / L ⎵ / ⊓⊓⊓ | L ⎵ | OVERDRIVE LOCKUP |
| L ⎵ | H ⎴ / L ⎵ | OVERDRIVE LOCKUP |
| H ⎴ | H ⎴ | NONE |

FIG. 3

AUTOMATIC TRANSMISSION CONTROL DEVICE FOR AUTOMOBILE

BACKGROUND OF THE INVENTION

1. Field of the Invention

The present invention relates to an automatic transmission control device for an automobile, and more particularly to an automatic transmission control device for an automobile which controls its shifting action to a predetermined position in response to an engine temperature or when the automobile cannot maintain its set fixed speed in stable driving.

2. Description of the Prior Art

A device is well known that electrically shifts and controls transmission gears of an automatic transmission automobile according to various driving conditions, and the link with a fixed speed driving apparatus, for example, makes the most suitable driving according to driving conditions.

The fixed speed driving apparatus mentioned above, for example, consists of such composition that the pressing of a set switch enables the automatic adjustment of the throttle valve, and can perform long time driving on the highway or the like at a fixed speed. In driving up a sloping road, however, the driving speed slows down from the set fixed speed and uphill capability decreases in this case. There arises such a problem that the transmission control is not performed correctly and responsively.

On the other hand, when the engine temperature does not reach up high enough suitably and the transmission gear is shifted up to a high speed position, the drive feeling and the operational handling of the automobile are put in a bad condition. Further, it takes time to warm up the engine.

In the prior art device, therefore, included therein is a shift control apparatus that restrains from shifting up to the overdrive position, when the driving speed remarkably slows down from the set fixed speed in driving up a sloping road, in other words, when deviation is enlarged from the set fixed speed, or when the cooling water does not reach up to a predetermined temperature.

In the shift control apparatus in the prior art, however, there are drawbacks in that uphill capability and the warm-up capacity of the engine of the automobile cannot be adequately compensated The drive feeling and the operational handling of the automobile cannot be maintained in good conditions, since the enlarged deviation from the set fixed speed or the low temperature of the cooling water simply restrain the transmission from shifting up to the overdrive position. Furthermore, in the shift control apparatus in the prior art there are drawbacks in that the input terminal numbers in a shift control circuit increase as detecting signal numbers increase, and that the composition becomes complicated.

SUMMARY OF THE INVENTION

Accordingly, it is a general object of the present invention to provide an automatic transmission control device for an automobile which improves uphill capability and warm-up capacity of the engine of an automobile with simple and less expensive composition, and can maintain the drive feeling and the operational handling of the automobile in good conditions.

In keeping with the principle of the present invention, the object is accomplished with an automatic transmission control device for an automobile which includes a fixed speed driving apparatus outputting a deviation enlargement signal when the deviation is enlarged from a set fixed speed of the automobile, a cooling water temperature detector outputting a cooling water temperature detection signal in accordance with the temperature of the cooling water, and a shift control circuit inputting said deviation enlargement signal and said cooling water temperature detection signal and controlling the transmission in accordance with deviation enlargement and temperature of the cooling water, wherein either one signal of said deviation enlargement signal or said cooling water temperature detection signal is output as a continuous signal and the other signal is output as a discontinuous signal so that said shift control circuit inputs both of said signals through a common input terminal.

BRIEF DESCRIPTION OF THE DRAWINGS

FIG. 3 is an illustration describing controlling contents according to respective input conditions of the control circuits shown in FIG. 1.

DETAILED DESCRIPTION OF THE DRAWINGS

Figure 1:
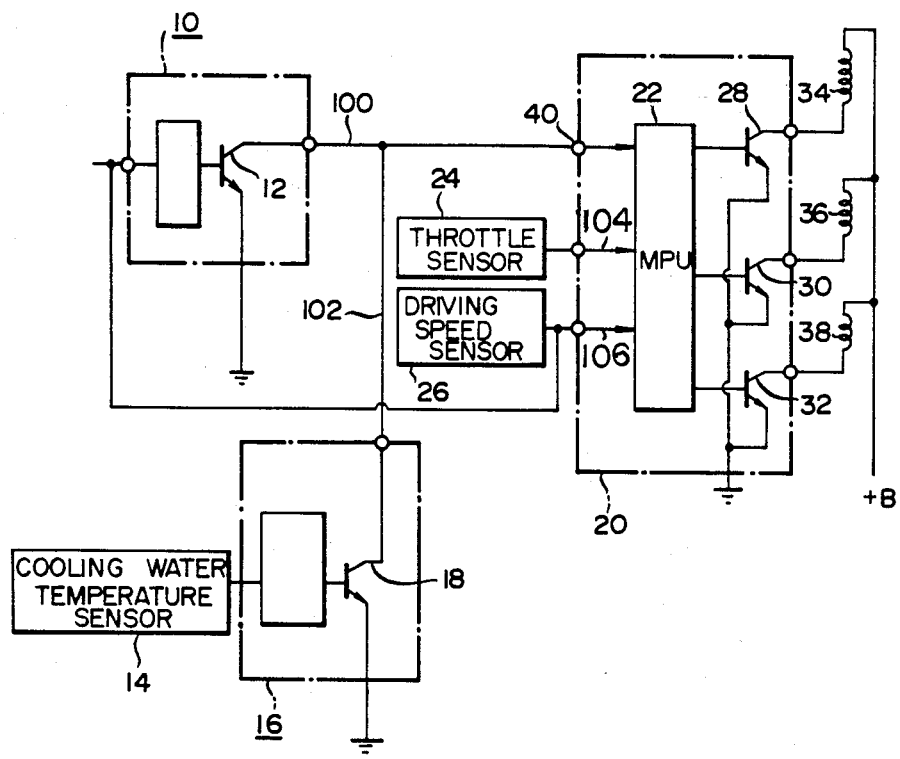
FIG. 1 is a block diagram showing a preferred embodiment of an automatic transmission control device for an automobile in accordance with the teachings of the present invention.

In FIG. 1 shown therein is a preferred embodiment of an automatic transmission control device for an automobile in accordance with the teachings of the present invention. In FIG. 1, a fixed speed driving apparatus 10 consists of an electronic control unit (referred hereinafter as ECU) and is composed so that it outputs a well-known fixed speed driving control signal, not illustrated, as well as it outputs deviation enlargement signal 100 from a transistor 12 when deviation is enlarged from the set fixed speed of the automobile.

A cooling water temperature detector 16 is provided in order to output cooling water temperature detection signal 102 according to a cooling water temperature detected by a cooling water temperature sensor 14. The cooling water temperature detector 16 is composed by the ECU so that it can output different signals at the respective stages divided into three stages of the cooling water temperatures under 35 degrees in Centigrade, between 35 and 50 degrees in Centigrade, and over 50 degrees in Centigrade on the basis of the cooling water temperature detected by the cooling water temperature sensor 14.

A shift control circuit 20 is provided in order to shift down and to restrain from shifting up to a predetermined gear position and locking up. The shift control circuit 20 is also composed by the ECU including a microprocessing unit (MPU) 22, and performs shift control to a desired most suitable position, not illustrated with details, being linked with the fixed speed driving apparatus 10. In other words, the shift control circuit 20 operates transistors 28 through 32 on and off on the basis of throttle opening signal 104 from a throttle sensor 24, driving signal 106 from a driving speed sensor 26 and the deviation enlargement signal 100 and the cooling water temperature detection signal 102 mentioned above so that it drives and controls shifting solenoids 34 and 36, and locking up solenoid 38 is controlled correspondingly to the respective shifting positions.

The present invention is characterized in that either one signal of the deviation enlargement signal 100 of the cooling water temperature detection signal 102 mentioned above is output as the continuous signal and the other signal is output as the discontinuous signal, and that the above mentioned shift control circuit 20 inputs both of these signals 100 and 102 from a common input terminal 40.

In other words, in this embodiment, the deviation enlargement signal 100 mentioned above is composed to be output as the GND signal only when the deviation is enlarged from the set fixed speed of the automobile, and the cooling water temperature detection signal 102 is composed to be output as the continuous pulse signal when the cooling water temperature is under 35 degrees in Centigrade and as the GND signal when the cooling water temperature is between 35 and 50 degrees in Centigrade. The transistors 12 and 18 have their collector terminals connected in common with each other, and the shift control circuit 20 is composed to be supplied both of these signals 100 and 102 through the common input terminal 40 so that the MPU can discriminate and process both of these signals 100 and 102.

Figure 2:
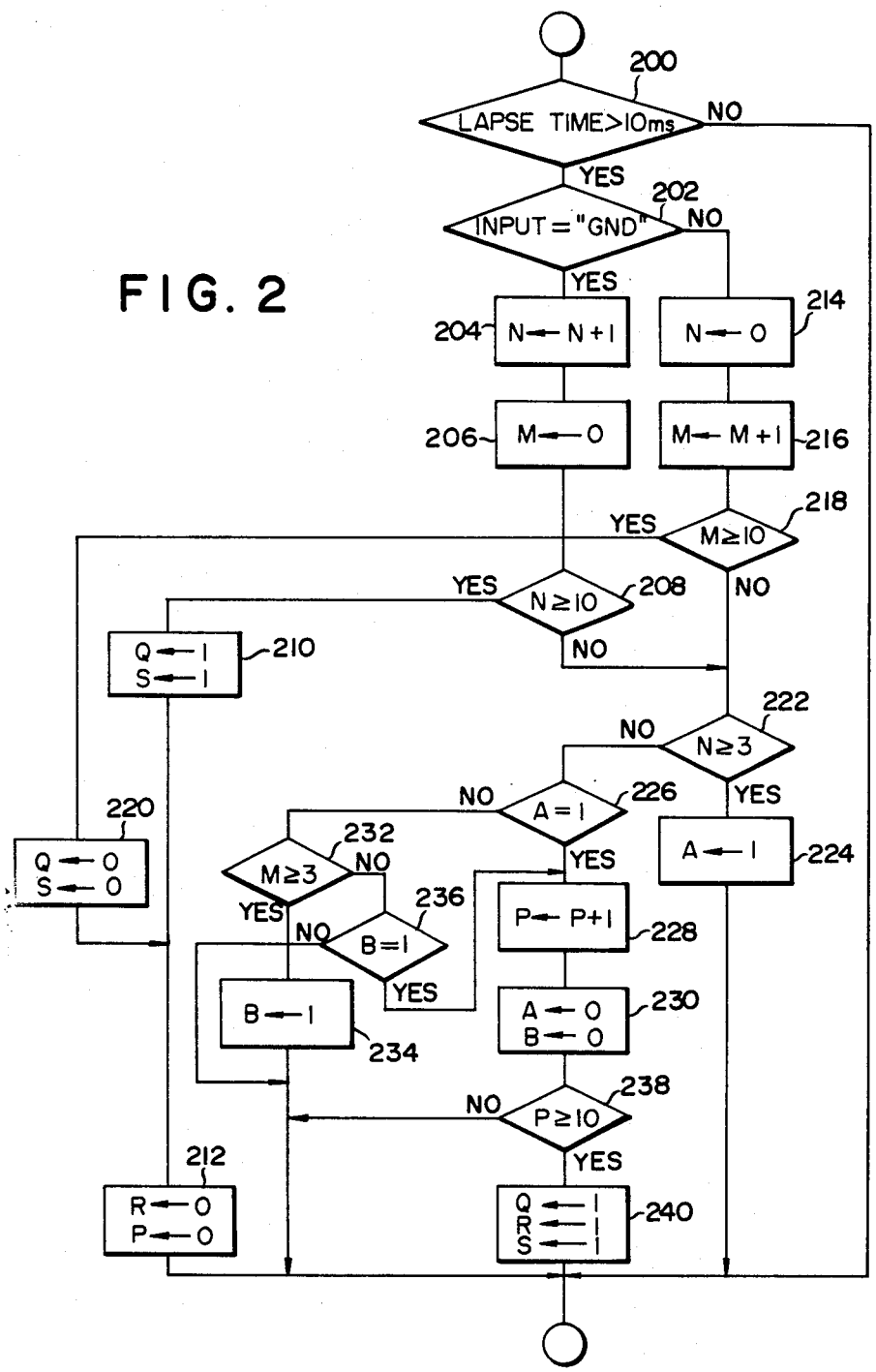
FIG. 2 is a flow chart showing signal discriminating actions and controlling contents of a shift control circuit.

FIG. 2 is a flow chart showing the signal discriminating action and the controlling contents of the shift control circuit 20, which are established as a sub-routine passing at every 10 (ms) on the way of main routine to be used for automobile control, not illustrated.

At first, the control is performed as hereinafter described when the input signals 100 and 102 are discriminated as the GND signals, or discriminated as the continuous pulse signals (10 Hz) or discriminated as the open states with no signals.

In other words, it is concluded in a step 200 whether or not it has taken 10 (ms) since the process of the previous sub-routine. In case it has taken 10 (ms), it is concluded in the next step 202 whether or not the input signals 100 and 102 are put in the GND state. In case the input signals 100 and 102 are concluded to be in the GND state, in the next step 204 the count value is advanced by 1 in a counter N which decides to prevent from shifting up to overdrive position. Further, in the next step 206 the count value is cleared in a counter M which decides not to prevent from shifting up to the overdrive position. It is concluded in a step 208 whether or not the count value of the counter N is over 10, in other words, whether or not the GND state continues over the time of 100 (ms) for one cycle of the continuous pulse signal. When the GND state continues on over 100 (ms), the input signals 100 and 102 are decided as the GND signals In this case the sub-routine steps onto a step 210, and both of an overdrive restraining flag Q and a lock-up restraining flag S become "1" so that the transmission is neither shifted up to the overdrive position nor locked up. Furthermore, when it steps onto a step 212, the count value is cleared in a counter P which decides not to prevent from shifting to the third position and a third position restraining flag R becomes "0" so that the third position restrained state can be released.

On the other hand, in case the input signals are discriminated not to be in the GND state in the step 202, the count value in the counter N is cleared in the next step 214, and the count value of the counter M is advanced by "1" in a step 216. When it steps onto a step 218, it is concluded whether or not the count value of the counter M exceeds 10, in other words, whether or not the open state continues over the time of 100 (ms) for one cycle of the continuous pulse signal. When the count value is concluded to exceed 10, the input signals 100 and 102 are decided as the open signals.

In this case the sub-routine steps onto a step 220, and the overdrive restraining flag Q and the lock-up restraining flag S become "0". Furthermore, in the step 212, the count value is cleared in the counter P which decides to prevent from shifting to the third position, and the third position restraining flag R becomes "0". Accordingly, when the input signals 100 and 102 are in the open state, the predetermined shift restraining action and the lock-up restraining action are not performed.

Furthermore, when the count value of the counter N is concluded to be under 9 in the step 208, or when the count value of the counter M is concluded to be under 9 in the step 218, it steps onto a step 222 and it is concluded whether or not the count value of the counter N exceeds 3, in other words, whether or not the GND state continues over 30 (ms). In case the count value exceeds 3, the pulse discriminating Flag A is made to be "1" in a step 224. When the count value is under 2, it steps onto the next step 226, and it is concluded whether or not the pulse discriminating flag A is "1". In case the pulse discriminating flag A is "1", the count value is advanced by 1 in the counter P which decides not to prevent from shifting to the third position and both of the pulse discriminating flags A and B are made to be "0" in a step 230.

On the other hand, in case the pulse discriminating flag A is decided a "0", it steps onto a step 232 and it is concluded whether or not the count value of the counter M exceeds 3, in other words, whether or not the open state continues over 30 (ms). When the count value exceeds 3, the pulse discriminating flag B is made to be "1" in a step 234. When the count value is under 2, it is concluded whether or not the pulse discriminating flag B is "1". In case the pulse discriminating flag B is "1", it steps onto the steps 228 and 230 as previously described. Accordingly, only when the count value of the counter N or M once exceeds 3 and again returns to 0, the input signal is decided as pulse signal, and it can step onto the step 228. As described heretofore, every leading edge or every trailing edge of the input signal advances the count value of the counter P one by one, and it is concluded in a step 238 whether or not the count value of the counter P exceeds 10, in other words, whether or not the pulse signal is repeated more than five cycles. In case this count value exceeds 10, the input signal is decided as the continuous pulse signal.

In the case it steps onto a step 240, and the over drive restraining flag Q, the third position restraining flag R and the lock-up restraining flag S are made to be "1". In such case that the input signal is decided as the continuous signal as mentioned above, the transmission gear is not only restrained from shifting to the third and the overdrive positions but also the locking-up action is retrained.

The controlling contents of the shift control circuit 20 according to the cooling water temperature and the deviation from the fixed speed of the automobile are hereinafter described.

As shown in FIG. 3, for example, in case of driving with the temperature of the cooling water being under 35 degrees in Centigrade the cooling water temperature detector 16 outputs the cooling water temperature detection signal 102 consisting of continuous pulse to the shift control circuit 20. The MPU 22; therefore, shifts down in accordance with the temprature of the cooling water, and also properly excite the shifting solenoids 34 and 36 and the locking-up solenoid 38 by way of transistors 28 through 32 to restrain from shifting up to the third and the overdrive positions as well as to restrain from the locking-up action.

On the other hand, when the deviation from the set fixed speed of the automobile is enlarged, the fixed speed driving apparatus 10 outputs the deviation enlargement signal 100 consisting of the GND signal to the shift control circuit 20. Consequently, the MPU 22 restrains from shifting up to the overdrive position as well as restrains from the locking-up action despite the signal contents of the cooling water temperature signal 102 output from the cooling water temperature detector 16.

Furthermore, in case the temperature of the cooling water is between 35 and 50 degrees in Centigrade, the cooling water temperature detector 16 outputs the cooling water detection signal 102 consisting of the GND signal to the shift control circuit 20, and the MPU 22 restrains from shifting up to the overdrive position as well as restrains from the locking-up action despite whether the deviation enlargement signal 100 is output from the fixed speed driving apparatus 10 or not.

When the temperature of the cooling water exceeds 50 degrees in Centigrade with driving at the set fixed speed, both of the fixed speed driving apparatus 10 and the cooling water temperature detector 16 do not output any signal, and the shift control circuit 20 does not restrain from shifting to a predetermined position nor restrain from the locking-up action, but normal control operation is performed.

As described heretofore, according to the present invention, either one of the deviation enlargement signal or the cooling water temperature detection signal is output as the continuous signal and the other one is output as the discontinuous signal. Since the shift control circuit is composed so that these two signals can be input through the common input terminal, the uphill capability and the warm-up capacity can be improved with the simple and less expensive composition and the drive feeling and the operational handling of the automobile can be preferrably maintained.

What we claimed is:

1. An automatic transmission control device for an automobile comprising:
   a fixed speed driving apparatus outputting a deviation enlargement signal when the acutal speed becomes less than a set fixed speed of the automobile;
   a cooling water temperature detector outputting a cooling water temperature detection signal in accordance with the temperature of the cooling water; and a shift control circuit receiving at a common input terminal said deviation enlargement signal and said cooling water temperature detection signal and controlling a transmission in accordance therewith, and wherein one of said deviation enlargement signal and said cooling water detection signal is in the form of a continuous signal at the shift control circuit common input terminal and the other is in the form of a discontinuous signal at the shift control circuit common input terminal.

2. An automatic transmission control device in accordance with claim 1 wherein said deviation enlargement signal is a continuous digital signal of high or low value, and said cooling water termperature signal is a digital signal of high or low value.

3. An automatic transmission control device in accordance with claim 2 wherein said cooling water temperature signal is a digital signal comprising one of a continuous signal and a pulse signal.

4. An automatic transmission control device in accordance with claim 1 wherein when said cooling water temperature is below a first predetermined value and regardless of whether the actual speed of the automobile becomes less than the set fixed speed, the cooling water temperature detection signal and the deviation enlargement signal combine at the shift control circuit to inhibit the transmission from shifting up to a third gear or to overdrive and to inhibit lockup.

5. An automatic transmission control device in accordance with claim 1 wherein regardless of the state of the cooling water temperature, when the actual speed of the automobile becomes less than the set fixed speed, the cooling water temperature detection signal and the deviation enlargement signal combine at the shift control circuit to inhibit the transmission from shifting to overdrive and to inhibit lockup.

6. An automatic transmission control device in accordance with claim 1 wherein when said cooling water temperature is between the first predetermined value and a second higher predetermined value, and regardless of whether the actual speed of the automobile becomes less than the set fixed speed, the cooling water temperature detection signal and the deviation enlargement signal combine at the shift control circuit to inhibit the transmission from shifting to overdrive and to inhibit lockup.

7. An automatic control device in accordance with claim 4 wherein when said cooling water temperature is above a second predetermined value and the actual speed of the automobile is not less than the set fixed speed, the shift control circuit allows normal operation of the transmission.

* * * * *